(12) United States Patent
Korol et al.

(10) Patent No.: US 11,241,823 B2
(45) Date of Patent: Feb. 8, 2022

(54) THREE DIMENSIONAL (3D) PRINTER WITH HIGH RESOLUTION LIGHT ENGINE

(71) Applicant: 3D Systems, Inc., Rock Hill, SC (US)

(72) Inventors: Evgeny Korol, San Diego, CA (US); Charles W. Hull, Santa Clarita, CA (US)

(73) Assignee: 3D Systems, Inc., Rock Hill, SC (US)

( * ) Notice: Subject to any disclaimer, the term of this patent is extended or adjusted under 35 U.S.C. 154(b) by 91 days.

(21) Appl. No.: 16/507,746

(22) Filed: Jul. 10, 2019

(65) Prior Publication Data

US 2020/0016824 A1    Jan. 16, 2020

Related U.S. Application Data

(60) Provisional application No. 62/695,907, filed on Jul. 10, 2018.

(51) Int. Cl.

| | |
|---|---|
| *B29C 64/135* | (2017.01) |
| *B29C 64/264* | (2017.01) |
| *B29C 64/153* | (2017.01) |
| *B29C 64/245* | (2017.01) |
| *B29C 64/393* | (2017.01) |
| *B33Y 10/00* | (2015.01) |

(Continued)

(52) U.S. Cl.
CPC .......... *B29C 64/135* (2017.08); *B29C 64/153* (2017.08); *B29C 64/245* (2017.08); *B29C 64/264* (2017.08); *B29C 64/393* (2017.08); *B33Y 10/00* (2014.12); *B33Y 30/00* (2014.12); *B33Y 50/02* (2014.12)

(58) Field of Classification Search
CPC ... B29C 64/135; B29C 64/264; B29C 64/236; B29C 64/209; B29C 64/245; B29C 64/393; B23K 26/082
See application file for complete search history.

(56) References Cited

U.S. PATENT DOCUMENTS

| | | |
|---|---|---|
| 6,180,050 B1 | 1/2001 | Arai et al. |
| 8,573,958 B2 | 11/2013 | Hangaard et al. |
| 8,836,916 B2 | 9/2014 | Jamar et al. |

(Continued)

FOREIGN PATENT DOCUMENTS

| | | |
|---|---|---|
| JP | 2003240924 | 12/2003 |
| WO | 95/05944 | 3/1995 |

(Continued)

OTHER PUBLICATIONS

PCT International Search Report the International Searching Authority for PCT/US2019/041182, dated Nov. 8, 2019 (6 pages).

(Continued)

*Primary Examiner* — Joseph S Del Sole
*Assistant Examiner* — Ariella Machness

(57) ABSTRACT

A three dimensional printing system for manufacturing a three dimensional article includes a build platform, a light engine, and a controller. The build platform is coupled to a vertical positioning apparatus. The light engine is configured to generate and scan a columnar array of light spots across a build plane. The columnar array of light spots are arranged along a second axis. The light spots are scanned along a first axis. The build plane is laterally defined by mutually perpendicular X and Y axes. In the build plane, the first axis is parallel to the X-axis.

6 Claims, 6 Drawing Sheets

(51) Int. Cl.
    *B33Y 30/00*     (2015.01)
    *B33Y 50/02*     (2015.01)

(56)         References Cited

U.S. PATENT DOCUMENTS

| | | |
|---|---|---|
| 8,915,620 B2 | 12/2014 | Vaes et al. |
| 9,073,261 B2 | 7/2015 | El-Sibani et al. |
| 9,073,262 B2 | 7/2015 | El-Sibani et al. |
| 9,079,355 B2 | 7/2015 | El-Sabani et al. |
| 9,956,727 B2 | 5/2018 | Steele |
| 10,399,183 B2 * | 9/2019 | Dallarosa ............. B23K 26/342 |
| 2015/0290876 A1 | 10/2015 | Liu et al. |
| 2016/0279707 A1 | 9/2016 | Mattes et al. |
| 2016/0311230 A1 | 10/2016 | Conrads et al. |
| 2017/0028647 A1 | 2/2017 | Chao et al. |
| 2017/0038690 A1 | 2/2017 | Jamar et al. |
| 2017/0050377 A1 * | 2/2017 | Gelbart ................. B29C 64/268 |
| 2017/0218208 A1 | 8/2017 | Bettles et al. |
| 2017/0304946 A1 * | 10/2017 | Shibazaki .............. B33Y 10/00 |
| 2018/0124341 A1 | 5/2018 | Harding et al. |
| 2018/0126646 A1 | 5/2018 | Zitelli et al. |
| 2018/0169970 A1 | 5/2018 | Harding et al. |
| 2018/0326664 A1 * | 11/2018 | DeMuth ................. B22F 12/00 |

FOREIGN PATENT DOCUMENTS

| | | |
|---|---|---|
| WO | 2016148341 | 1/2016 |
| WO | 2016201326 | 12/2016 |
| WO | 2017127061 | 1/2017 |

OTHER PUBLICATIONS

PCT International Written Opinion the International Searching Authority for PCT/US2019/041182, dated Nov. 8, 2019 (7 pages).
English translation of Japanese Publication No. 2003-340924A, provided in PCT International Search Report of the International Searching Authority for PCT/US2019/041182, dated Nov. 8, 2019 (43 pages).

* cited by examiner

THREE DIMENSIONAL (3D) PRINTER WITH HIGH RESOLUTION LIGHT ENGINE

CROSS-REFERENCE TO RELATED APPLICATIONS

This non-provisional patent application claims priority to U.S. Provisional Application Ser. No. 62/695,907, Entitled "Three Dimensional (3D) Printer with High Resolution Light Engine" by Evgeny Korol et al., filed on Jul. 10, 2018, incorporated herein by reference under the benefit of 35 U.S.C. 119(e).

FIELD OF THE INVENTION

The present disclosure concerns a three dimensional (3D) printer for manufacturing an article in a layer-by-layer process. More particularly, the 3D printer has an imaging system that selectively images layers with very high resolution and speed.

BACKGROUND

Three dimensional (3D) printing systems are in rapidly increasing use for manufacturing three dimensional articles of varying composition. Some of these three dimensional printing systems utilize the application of energy to selectively cure or fuse materials. The energy is applied using imaging systems such as lasers. There is an ongoing need to improve both resolution and speed of the imaging systems.

SUMMARY

Figure 1:
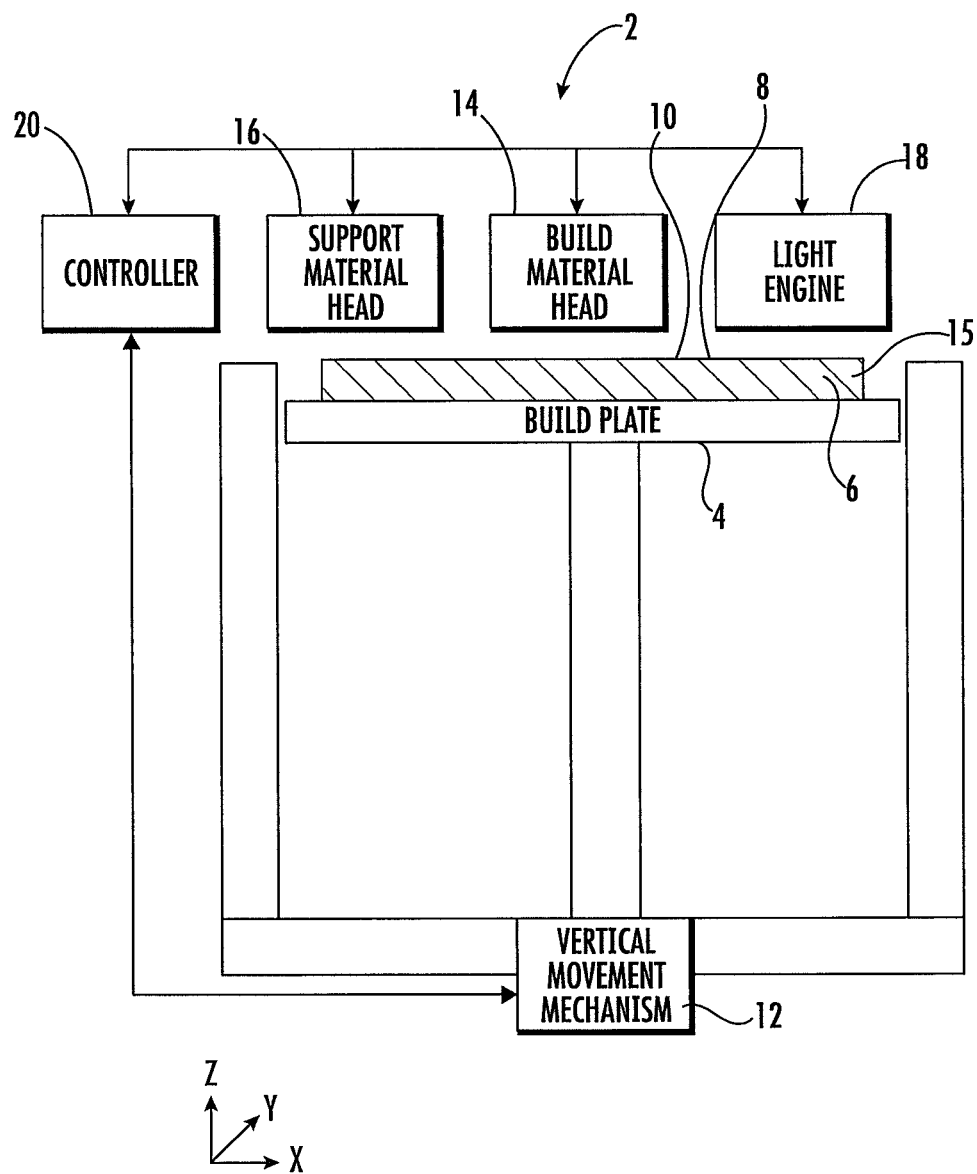
FIG. 1 is a schematic block diagram of an embodiment of a three dimensional printing system.

In a first aspect of the disclosure, a three dimensional (3D) printing system for manufacturing a three dimensional article includes a build platform, a light engine, and a controller. The build platform is coupled to a vertical positioning apparatus. The light engine is configured to generate and scan an array of light spots across a build plane. The columnar array of light spots are arranged along a second axis. The light spots are scanned along a first axis. The build plane is laterally defined by mutually perpendicular X and Y axes. In the build plane, the first axis is parallel to the X-axis. The controller is configured to: (1) Operate the vertical positioning mechanism to position a top surface above the build platform proximate to the build plane. (2) Dispense or otherwise provide a layer of build material over the top surface. (3) Operate the light engine to: (a) scan the light spots over the build plane and the scanning light spots image the build material along spaced-apart stripes that are parallel to the X-axis and are separated from each other along the Y-axis leaving unimaged stripes, and (b) repeat (a) one or more times with the light spots shifted in Y in order to image the unimaged stripes. (4) Repeat steps (1)-(3) until the three dimensional article is fully formed.

In one implementation the three dimensional printing system includes a material dispenser that dispenses the layer of build material over the top surface. The material dispenser can be a piezoelectric inkjet printhead that dispenses a photocurable resin which is hardened by a cure mechanism. Alternatively the material dispenser can be a powder dispenser that dispenses fusible powder which is thermally fused by a heating mechanism.

In another implementation the light engine includes a beam generator and a scanning system. The beam generator generates a columnar array of light beams that are arranged along the second axis. The scanning system scans the columnar array of light beams along the first axis. The beam generator can include a light source, a spatial light modulator, a beam expander, a columnar array of micro-lenses, and a beam deflector. The spatial light modulator can include a columnar array of controllable elements that each receive light from the light source and output a modulated light beam; the spatial light modulator outputs a columnar array of modulated light beams. The beam expander can expand the columnar array of light beams along the second axis. The columnar array of micro-lenses can shrink each beam at least along the second axis and the modulated light beams are spaced apart along the second axis. The resultant spacing or separation between the light beams corresponds to the unimaged stripes during a single scan of the light beams along the first axis. The beam deflector can controllably provide different sets of Y-values for the impingement of the light beams on the build plane. The impingement of each light beam onto the build plane provides a light spot. The scanning system can include a rotating polygon mirror with each facet of the polygon mirror corresponding to a single scan of the light spots across the build plane. There may be more than one beam expander as part of the light engine.

In yet another implementation the light engine includes a spatial light modulator having a two dimensional array of micro-mirror elements. The micro-mirror elements can be individually tilted to either direct light into a light trap or toward the build plane.

In a further implementation the light engine includes a spatial light modulator having a columnar or linear array of light modulating elements. The spatial light modulator can be referred to as a "grating light valve" which is a dynamically adjustable diffraction grating.

In a yet further implementation the light engine includes a module that selectively generates a columnar or rectangular array of light spots. The array of light spots are scanned across the build plane through a linear transport of the module across the build plane.

In another implementation the light engine includes a module that selectively generates a columnar or rectangular array of light spots. The array of light sports are scanned across the build plane through scanning optics. The scanning optics can include one or more of a polygon mirror, a galvanometer mirror, and other optics for controllably deflecting light beams.

DETAILED DESCRIPTION OF THE PREFERRED EMBODIMENTS

FIG. 1 is a schematic block diagram of an embodiment of a three dimensional (3D) printing system 2. In describing the three dimensional printing system 2, mutually perpendicular axes X, Y, and Z may be used. Axes X and Y are lateral axes that are substantially horizontal. Axis Z is a vertical axis that is substantially aligned with a gravitational reference.

The three dimensional printing system 2 includes a build plate 4 upon which a three dimensional article 6 is being formed in a layer-by-layer process. The three dimensional article 6 (or the build plate 4 at the beginning of a build process) defines an upper surface 8 upon which a next layer of a material is to be selectively defined at a build plane 10. Material is added when the upper surface 8 is disposed at or proximate to the build plane 10. A vertical positioning mechanism 12 provides a controllable vertical position of the build plate 4 and hence the upper surface 8. The build plane 10 extends laterally along the X and Y axes.

In the illustrated embodiment, a build material dispensing head 14 is configured to dispense build material 15 upon the build plane 10. Also shown is a support material dispensing head 16 for dispensing support material around the build material 15 that forms the three dimensional article 6.

A light engine 18 is configured to selectively image a layer of build material 15 at the build plane 10. Selectively imaging portions of build plane 10 selectively hardens or fuses a layer of the build material 15 onto the upper surface 8.

A controller 20 is coupled to portions of the three dimensional printing system 2 including the vertical movement mechanism 12, the build material dispensing head 14, the support material dispensing head 16, the light engine 18, and other devices. The controller 20 includes a processor coupled to an information storage device. The information storage device includes non-transient or non-volatile data storage storing software instructions. When executed by the processor, the software instructions control portions of the three dimensional printing system 2. The controller 20 can be located in one portion of the three dimensional printing system 2 or can be distributed at various locations inside and/or outside of the three dimensional printing system 2. The controller 20 may be distributed among various types of computers including client devices (e.g., desktop computers, laptop computers, smartphones, tablet computers, etc.), server computers, and/or mainframe computers.

Figure 2:
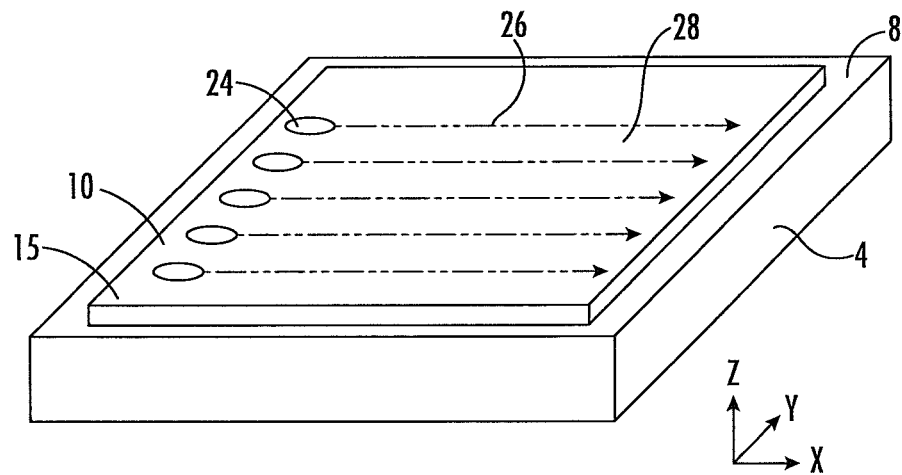
FIG. 2 is a schematic diagram illustrating an embodiment of selective curing or fusing of build material.

FIG. 2 depicts the selective hardening or fusing of build material 15 upon the build plate 4 by the action of the light engine 18 during a first or initial scan. The light engine 18 generates a columnar arrangement of light spots 24 that are arrayed or arranged along a direction parallel to the Y-axis. The light spots 24 are scanned along the X-axis as depicted. As they scan along the X-axis, the light spots 24 turn on and off to selectively harden build material 15 along imaged stripes 26. Between the imaged stripes 26 are not-yet-imaged (unimaged) stripes 28 of build material 15. Subsequent scans of the light spots 24 will image the build material 15 in the unimaged stripes 28. While FIG. 2 illustrates the light spots as arranged along the Y-axis, it is to be understood that in some embodiments the light spots can be arranged along an oblique lateral axis that is not parallel to the Y-axis.

Figure 3:
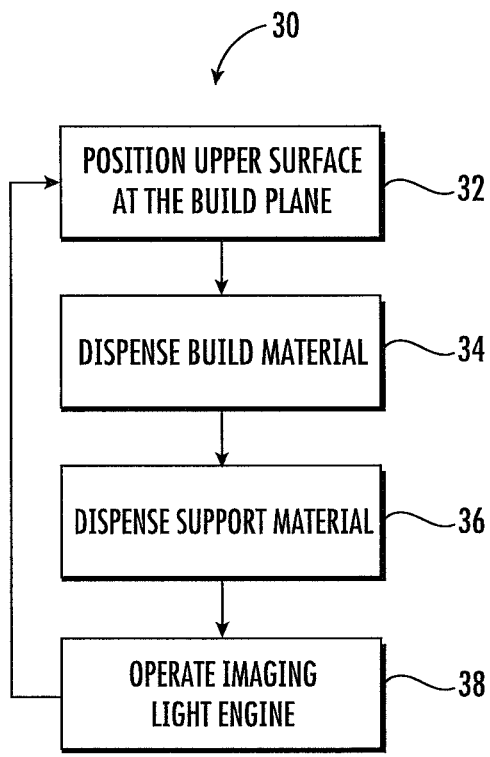
FIG. 3 is a flowchart depicting an embodiment of a method of operating the three dimensional printing system.

FIG. 3 is a flowchart depicting a method 30 of operating the three dimensional printing system 2. Steps 32-38 of method 30 are performed by controller 20 as it operates on portions of the three dimensional printing system 2. According to step 32, the upper surface 8 is positioned at the build plane 10. Upper surface 8 can be a top surface of the build plate 4 to receive the first layer of build material 15 or a top surface of the three dimensional article 6 as it is being formed.

According to step 34, a layer of build material 15 is deposited at the build plane 10 over the upper surface 8. In some embodiments support material is also deposited around the build material 15 as in step 36. Steps 34 and 36 can be performed sequentially or at the same time. According to step 38 the light engine 18 is operated to selectively harden the build material 15 at build plane 10. Steps 32-38 are repeated until the three dimensional article 6 is manufactured.

Figure 4A:
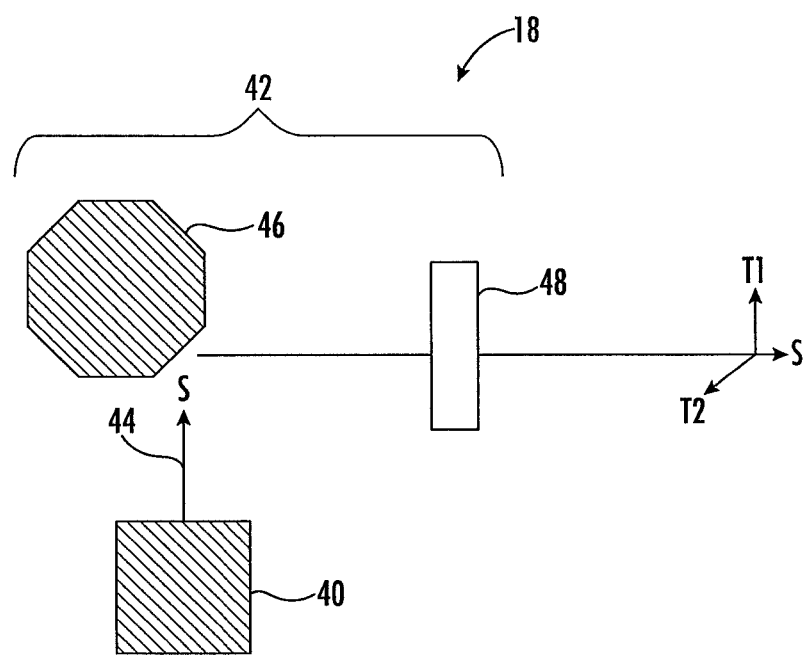
FIG. 4A is a schematic diagram of an embodiment of a light engine.
Figure 4B:
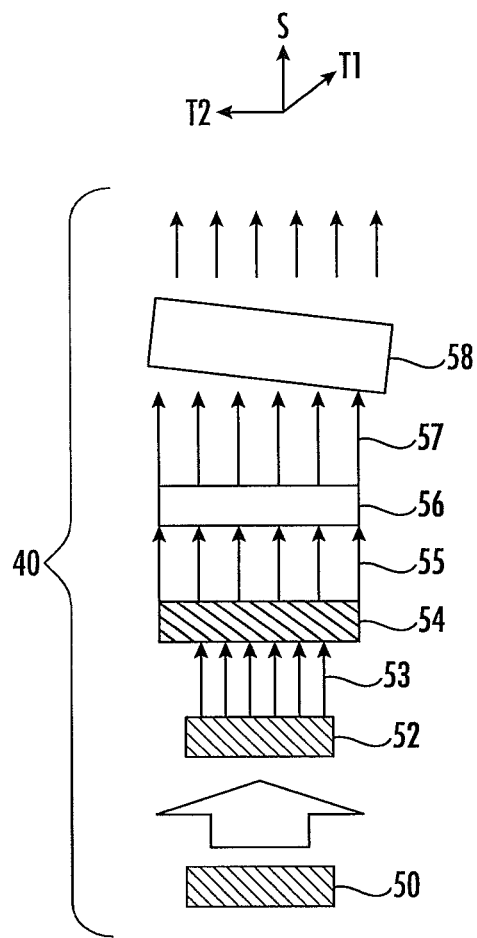
FIG. 4B is a schematic diagram of an embodiment of a parallel beam generator.

FIGS. 4A and 4B are schematic diagrams depicting an embodiment of light engine 18. Axes used include S, T1, and T2. The S-axis is generally along the direction of light propagation along an optical path which varies in absolute direction. The T1-axis and T2-axis are first and second axes respectively that are transverse to S and are not parallel. The direction T1 is a scan direction for light beams. T1 is parallel to X in the build plane but may have a different direction at other parts of the optical path of the light beams. The direction T2 is a direction along which a plurality of light beams are arrayed. T2 can be parallel to the Y-axis in the build plane or it can define an oblique angle with respect T1 and Y.

FIG. 4A is a schematic diagram of the light engine 18 viewed along the axis T2. Light engine 18 includes a parallel beam generator 40 and a scanning system 42. The parallel beam generator 40 is configured to emit a columnar array of parallel light beams 44. The parallel light beams 44 reach the scanning system 42 which causes them to scan back and forth along the axis T1.

The scanning system 42 can include a polygon mirror 46 and an F-theta lens system 48. In rotation about axis T2, each facet of the polygon mirror 46 causes each beam to scan over the build plane 10 along the X-axis.

FIG. 4B is a schematic diagram of an embodiment of the parallel beam generator 40 viewed along the scan axis T1. The parallel beam generator 40 includes a plurality of components that define an optical path sequence. The parallel beam generator 40 includes a light source 50, a spatial light modulator 52, a beam expander 54, a columnar arrangement of micro-lenses 56, and a beam deflector 58.

The light source 50 generates an elongate sheet of radiation. The spatial light modulator 52 has a columnar or linear array of light modulating elements. In one embodiment, spatial light modulator 52 is a grating light valve. The output of the spatial light modulator 52 is a columnar array 53 of light beams that are arranged along the T2-axis. This columnar array has very small or no gaps between the individual beams of light.

The beam expander 54 increases the beam array dimension along the T2-axis. In one embodiment, the beam expander expands the array length along the T2-axis to an output columnar array of beams 55 to span the entire build plane 10. Then the array of micro-lenses 56 shrinks each individual beam diameter according to a desired resolution. This results in a columnar array of beams 57 with gaps between them defined along the T2-axis. These gaps correspond to the not-imaged stripes 28 for a given scan (per FIG. 2).

The beam deflector 58 controllably deflects the columnar array of beams 57 along the T2 axis. The shift along the T2-axis has a large enough range to allow the beams to address the entire build plane 10 despite the gaps between the individual beams. Thus, the beam deflector 58 can vary the deflection of the light spots 24 for a distance at least equal to the width of the gaps between the beams 57 as measured in the Y-axis. In one embodiment, the beam deflector 58 is a plate of glass. A controlled rotation of the plate of glass will controllably deflect the columnar array of beams 57 along the T2-axis.

The combination of beam expander 54 and micro-lenses 56 provides at least two benefits. They provide an enhanced resolution for the light engine 18. Also, they allow the light engine 18 to be located back away from the focal plane to avoid disturbing the build plane 10.

Figure 5:
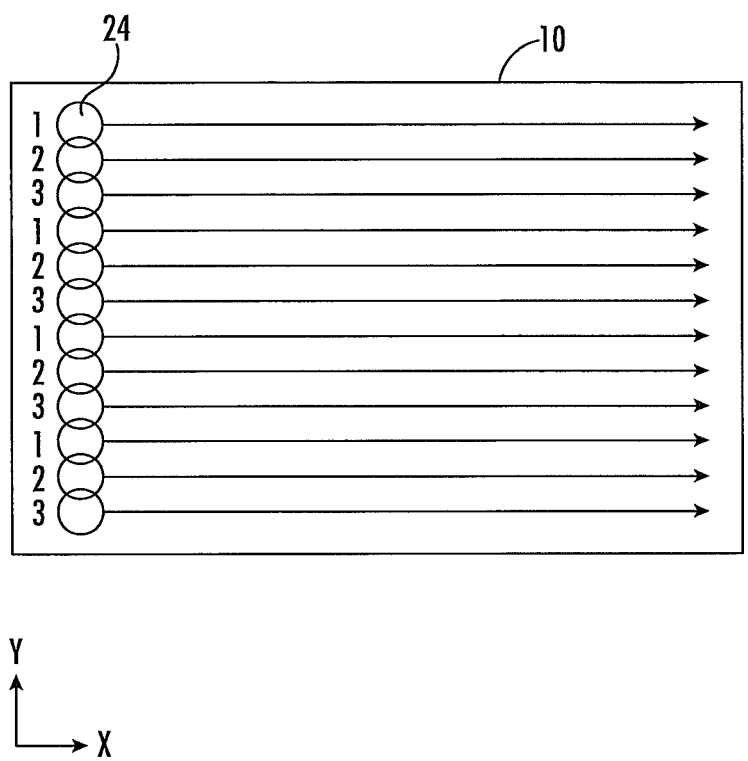
FIG. 5 is an illustration of a "three pass" scanning of a build plane.

FIG. 5 depicts a "three-pass" scanning of a build plane 10. The open circles 24 represent dots of light 24 (light spots 24) that are scanned along the X-axis. The numbers 1, 2, and 3 refer to the scan sequence. The scans labeled 1 represent the first scan. The first scan does not image the entire build plane 10 and leaves unimaged stripes 28 that are later addressed with scans 2 and 3.

In describing scanning and imaging herein, it is to be understood that "imaging a stripe" is the scanning of a variable light spot 24 along the build plane 10 parallel to the X-axis. The light spot 24 is variable because it varies in intensity along the path to provide a modulated dosage of radiation to selectively harden portions of the build material in the build plane 10. Imaging a stripe 26 therefore means selectively irradiating the stripe 26 during a scan. Unimaged stripes 28 are elongate portions of the build plane 10 that have not yet been imaged but will be imaged in a later scan.

Figure 6:
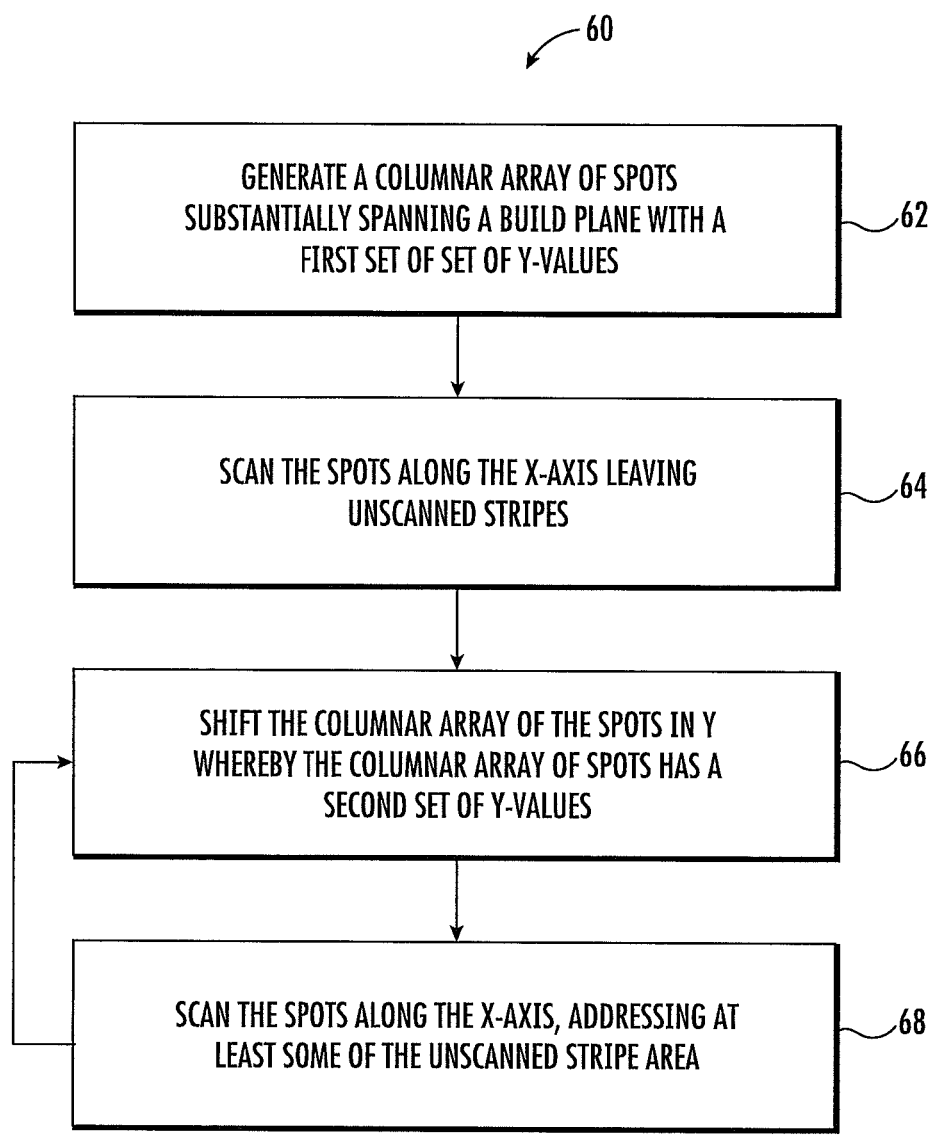
FIG. 6 is a flowchart depicting a method of operating a light engine.

FIG. 6 is a flowchart depicting a method 60 of operating the light engine 18. The method 60 is an embodiment of step 38 of FIG. 3. The light engine 18 can be the light engine 18 described with respect to FIGS. 4A and 4B. The discussion of FIG. 6 will refer back to FIG. 5 as a simplified example.

According to step 62, the light engine 18 generates a columnar array of light spots 24 that span most of the Y-axis of the build plane 10. In FIG. 5, the array of open circles labeled 1 illustrate such an array of spots. Also according to step 62, the beam deflector 58 positions the array of light spots 24 at the particular set of Y-values labeled 1.

According to step 64, the scanning system 42 scans the array of spots across the build plane 10. This is represented by the left to right arrows emanating from the circles labeled 1 in FIG. 5.

According to step 66, the array of light spots 24 is shifted in Y. This is illustrated as the circles labeled 2 in FIG. 5. According to step 68, the scanning system scans the array of light spots 24 across the build plane 10. This second scan is represented by the left to right arrows emanating from the circles labeled 2.

Steps 66 and 68 are repeated for a total of N scans (including step 64) and the build plane is fully addressed. FIG. 5 illustrates N=3. Thus, there are three separate scans each having a different set of Y-values for the array of spots 24.

In practice, the number of scans N is going to largely be a function of the beam compression provided by the micro-lenses and desired resolution. Generally speaking, if the beam diameter is reduced in size by a factor of M then there is a minimum of M scans required to fully image the image plane 10. In some cases N>M to provide a degree of overlap between scans. Also, N may be larger to provide incremental shifts in Y to enhance resolution.

In another embodiment, the array of light spots 24 can be arranged at an oblique angle with respect to the Y-axis. In this embodiment, the light spots will still scan along the X-axis and will still span the Y-axis. One reason for utilizing an oblique angle is to increase the resolution provided by the spatial light modulator 52.

The specific embodiments and applications thereof described above are for illustrative purposes only and do not preclude modifications and variations encompassed by the scope of the following claims.

What is claimed:

1. A three dimensional (3D) printing system for manufacturing a three dimensional article comprising:
   a build platform coupled to a vertical positioning apparatus;
   a build material head containing a photocurable resin;
   a light engine that scans an array of light spots across a build plane, scanning is along a first axis and the array of light spots is arranged along a second axis, build plane locations are laterally defined by an X-axis and a Y-axis, the first axis is parallel to the X-axis;
   a controller configured to:
   (1) operate the vertical positioning apparatus to position a top surface above the build platform proximate to the build plane;
   (2) operate the build material head to dispense a layer of the photocurable resin over the top surface;
   (3) operate the light engine to:
      (a) scan the light spots over the build plane, the scanning light spots image the build material along stripes that are parallel to the X-axis and are separated from each other along the Y-axis leaving unimaged stripes between the imaged stripes; and
      (b) repeat (a) one or more times with the light spots shifted in Y in order to image the unimaged stripes; and
   (4) repeat steps (1)-(3) until the three dimensional article is formed;
   wherein the light engine includes a parallel beam generator that generates a plurality of light beams along the second axis and a scanning system that receives the plurality of light beams and scans the plurality of light beams along the first axis;
   the parallel beam generator includes a spatial light modulator that includes a columnar array of controllable light modulating elements, the columnar array of controllable light modulating elements individually receive light from a light source and output a modulated light beam, the spatial light modulator outputs a columnar array of modulated light beams, the light modulator is a grating light valve based upon a dynamically adjustable diffraction grating.

2. The three dimensional printing system of claim 1 further comprising a material dispenser that dispenses the layer of build material over the top surface.

3. The three dimensional printing system of claim 1 wherein the parallel beam generator includes:
   a beam expander that expands the columnar array of light beams along the second axis; and
   a columnar array of micro-lenses that each shrink one of the light beams, the light beams are separated by gaps that correspond to the unimaged stripes in step (a).

4. The three dimensional printing system of claim 3 wherein the parallel beam generator includes a beam deflector configured to shift the light spots according to step (b).

5. The three dimensional printing system of claim 1 wherein the scanning system includes a polygon mirror.

6. A three dimensional (3D) printing system for manufacturing a three dimensional article comprising:
   1) a build platform coupled to a vertical positioning apparatus;
   2) a build material head containing a photocurable resin;
   3) a light engine that further includes:
      a) a parallel beam generator that generates a plurality of light beams arranged along a second axis, the parallel beam generator includes a spatial light modulator that includes a columnar array of controllable light modulating elements, the columnar array of controllable light modulating elements individually receive light from a light source and output a modulated light beam, the spatial light modulator outputs a columnar array of modulated light beams, the parallel beam generator includes a beam deflector configured to deflect the columnar array of modulated light beams along the second axis, the light modulator is a grating light valve based upon a dynamically adjustable diffraction grating; and b) a scanning system that scans the plurality of light beams along a first axis; and a) operate the build platform to position a top surface proximate to a build plane and to provide a layer of resin upon the top surface, the build plane having a lateral extent defined by an X-axis and a Y-axis;

b) operate the build material head to dispense a layer of the photocurable resin over a top surface;

c) operate the light engine including:
  i) operate the parallel beam generator to provide a plurality of light spots that span at least a portion of the Y-axis;
  ii) operate the beam deflector to position the spots with a set of Y-values;
  iii) operate the scanning system to scan the spots along the X-axis leaving unimaged stripes of the build plane that have not been scanned; and
  iv) repeat steps i), ii), and iii) with different beam deflections along the Y-axis to image the unimaged stripes; and d) repeat a) and b) and c) until the three dimensional article has been manufactured.

* * * * *